United States Patent
Chaudhry et al.

(10) Patent No.: US 6,247,027 B1
(45) Date of Patent: Jun. 12, 2001

(54) FACILITATING GARBAGE COLLECTION DURING OBJECT VERSIONING FOR SPACE AND TIME DIMENSIONAL COMPUTING

(75) Inventors: Shailender Chaudhry, San Francisco; Marc Tremblay, Menlo Park, both of CA (US)

(73) Assignee: Sun Microsystems, Inc., Palo Alto, CA (US)

(*) Notice: Subject to any disclaimer, the term of this patent is extended or adjusted under 35 U.S.C. 154(b) by 0 days.

(21) Appl. No.: 09/313,243

(22) Filed: May 17, 1999

(51) Int. Cl.[7] ................................................ G06F 17/30
(52) U.S. Cl. ..................... 707/206; 707/203; 707/100; 395/712
(58) Field of Search .................................. 707/203, 206, 707/100; 395/712

(56) References Cited

U.S. PATENT DOCUMENTS

| | | | |
|---|---|---|---|
| 5,692,193 | 11/1997 | Jagannathan et al. | 395/676 |
| 5,724,565 | * 3/1998 | Dubey et al. | 712/245 |
| 5,812,811 | * 9/1998 | Dubey et al. | 712/216 |
| 6,032,245 | * 2/2000 | Georgiou et al. | 712/23 |

FOREIGN PATENT DOCUMENTS 0 425 420 A2  10/1990  (EP) .

OTHER PUBLICATIONS

Chen, et al.; "Exploiting Method–Level Parallelism in Single–Threaded Java Programs"; Proceedings of PACT'98, Oct. 12–18, 1998; Paris, France; 9 pages.

Gopal, et al.; "Speculative Versioning Cache"; To appear in the Fourth International Symposium on High–Performance Computer Architecture; pp. 1–11.

Article entitled "Predicting Lifetimes in Dynamically Allocated Memory," by David A. Cohn and Satinder Singh, MIT Press, 1997.

* cited by examiner

Primary Examiner—Jean R. Homere
(74) Attorney, Agent, or Firm—Park, Vaughan & Fleming LLP

(57) ABSTRACT

One embodiment of the present invention provides a system that facilitates garbage collection and supports space and time dimensional execution of a computer program. The system executes program instructions with a head thread and speculatively executes program instructions in advance of the head thread with a speculative thread. During execution of the speculative thread, the system creates space-time dimensioned versions of objects from a system heap that are modified by the speculative thread. These space-time dimensioned versions of objects are created in a speculative heap that is separate from the system heap. The system keeps a record of objects for which space-time dimensioned versions have been created during updates to value fields and during updates to pointer fields by the speculative thread. This record is used during a garbage collection operation to identify live objects so that the garbage collection operation can move the live objects from the speculative heap to the system heap. In one embodiment of the present invention, if the speculative thread causes a hazard condition, the system performs a rollback. This rollback uses the record to identify objects in the system heap that have been modified by the speculative thread so that the modifications can be undone. Note that a hazard condition can occur if the head thread writes to a field that was read by the speculative thread, or alternatively if the head thread writes to a space-time dimensioned version of an object that was written to by the speculative thread.

21 Claims, 8 Drawing Sheets

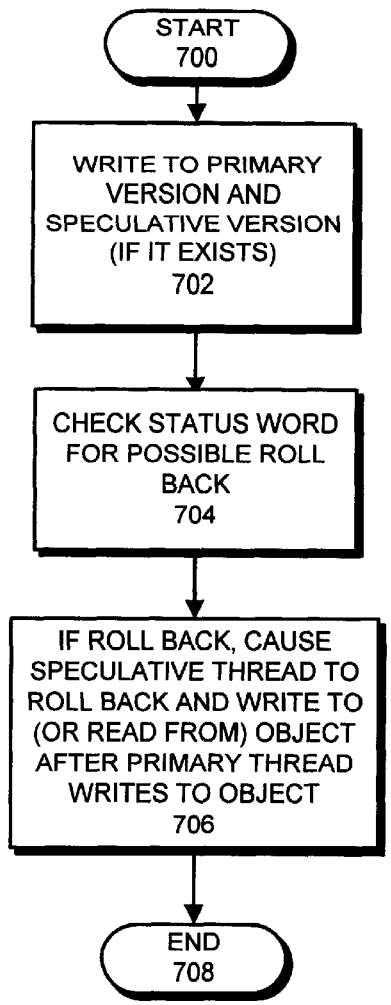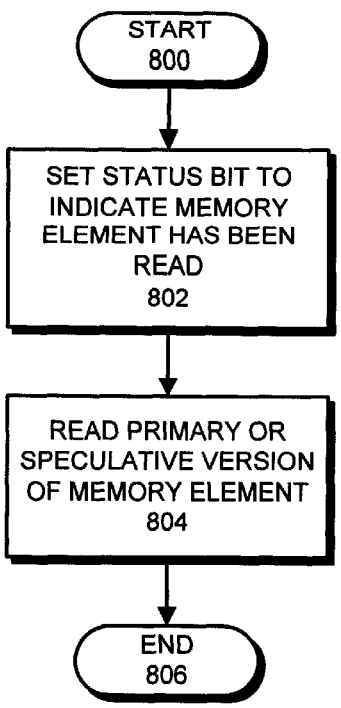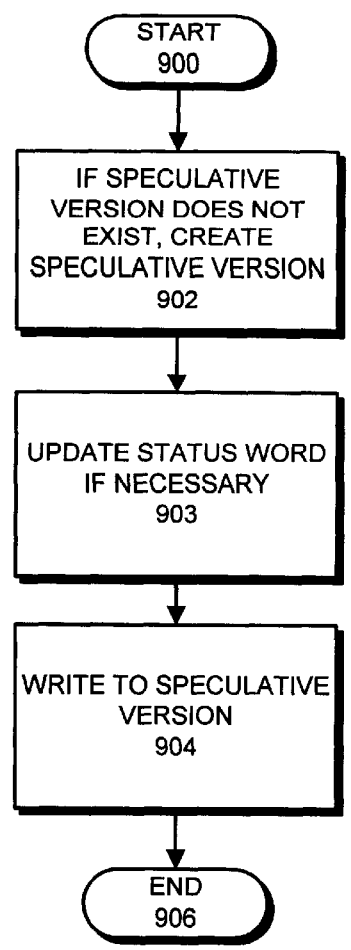
FIG. 7
FIG. 8
FIG. 9

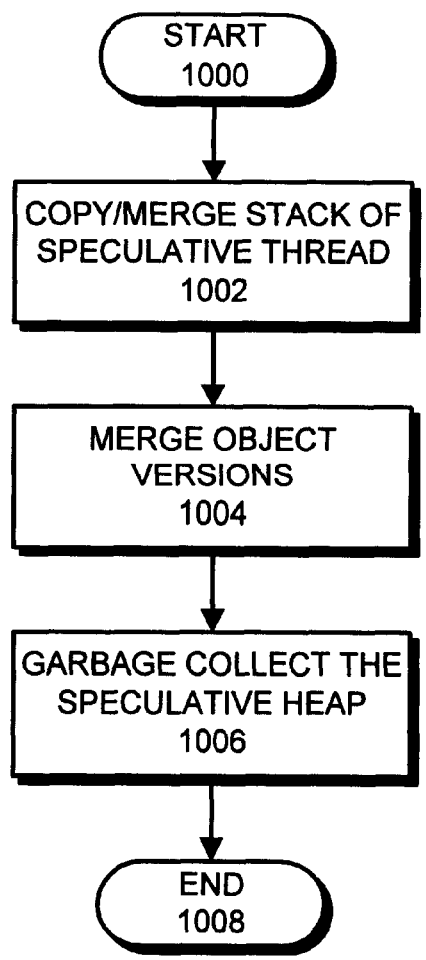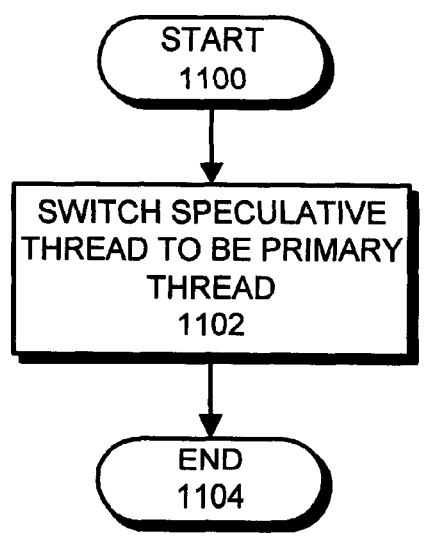
FIG. 10          FIG. 11

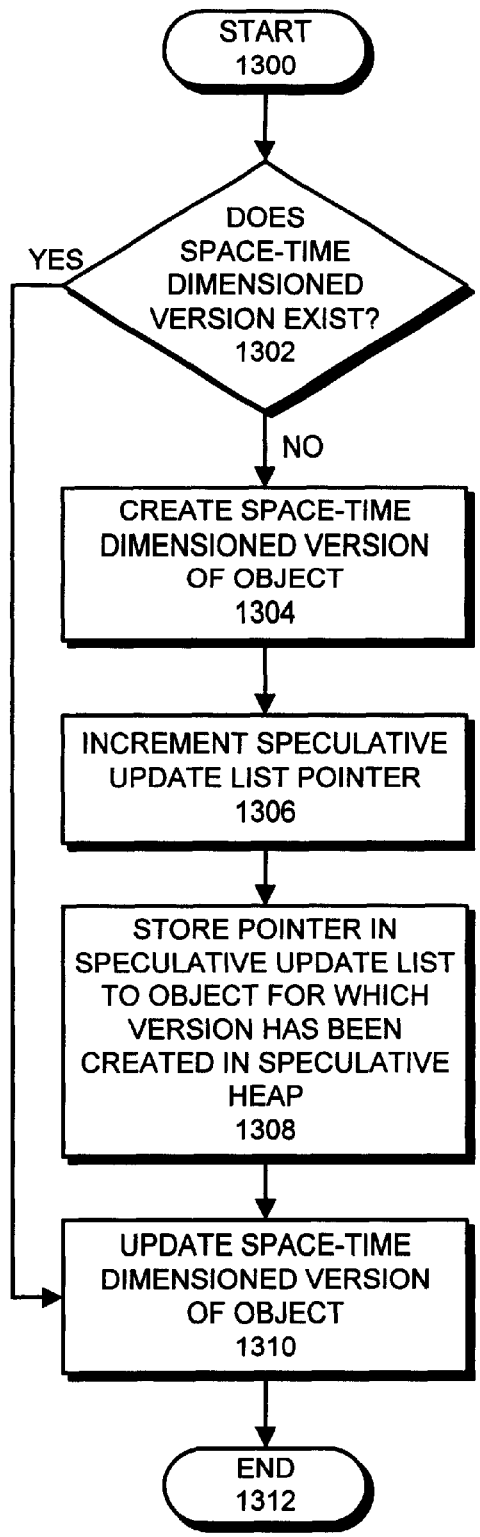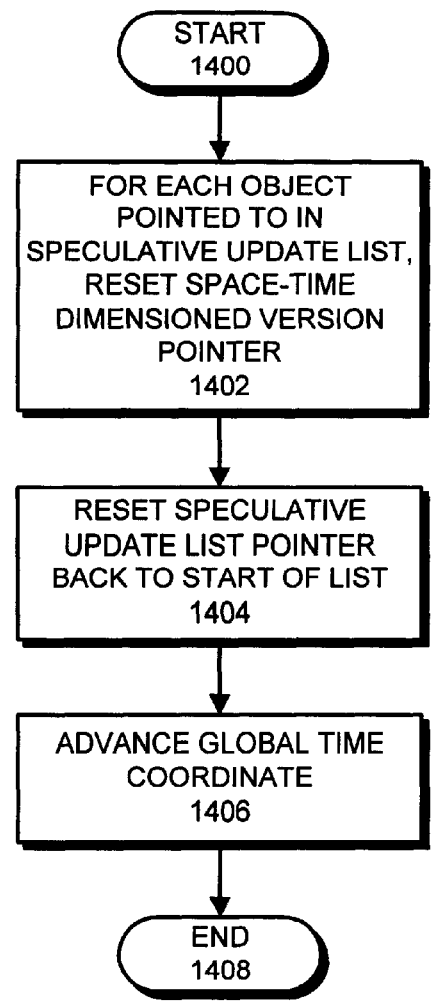
FIG. 13
FIG. 14

FACILITATING GARBAGE COLLECTION DURING OBJECT VERSIONING FOR SPACE AND TIME DIMENSIONAL COMPUTING

RELATED APPLICATION

The subject matter of this application is related to the subject matter in a co-pending non-provisional application by the same inventors as the instant application and filed on the same day as the instant application entitled, "Supporting Space-Time Dimensional Program Execution by Selectively Versioning Memory Updates," having ser. no. 09/313229, and filing date May 17, 1999.

BACKGROUND

1. Field of the Invention

The present invention relates to garbage collection techniques in computer systems. More specifically, the present invention relates to a method and an apparatus that uses information gathered for roll back purposes by a speculatively executing thread in order to speed up the garbage collection process.

2. Related Art

As increasing semiconductor integration densities allow more transistors to be integrated onto a microprocessor chip, computer designers are investigating different methods of using these transistors to increase computer system performance. Some recent computer architectures exploit "instruction level parallelism," in which a single central processing unit (CPU) issues multiple instructions in a single cycle. Given proper compiler support, instruction level parallelism has proven effective at increasing computational performance across a wide range of computational tasks. However, inter-instruction dependencies generally limit the performance gains realized from using instruction level parallelism to a factor of two or three.

Another method for increasing computational speed is "speculative execution" in which a processor executes multiple branch paths simultaneously, or predicts a branch, so that the processor can continue executing without waiting for the result of the branch operation. By reducing dependencies on branch conditions, speculative execution can increase the total number of instructions issued.

Unfortunately, conventional speculative execution typically provides a limited performance improvement because only a small number of instructions can be speculatively executed. One reason for this limitation is that conventional speculative execution is typically performed at the basic block level, and basic blocks tend to include only a small number of instructions. Another reason is that conventional hardware structures used to perform speculative execution can only accommodate a small number of speculative instructions.

What is needed is a method and apparatus that facilitates speculative execution of program instructions at a higher level of granularity so that many more instructions can be speculatively executed.

One performance drawback for programming languages, such as the Java programming language, is garbage collection. A computer system executing a program written in the Java programming language must periodically perform garbage collection to reclaim memory elements that have become de-referenced during program execution. In order to speed up this process, systems often keep track of modifications that are made to pointers during program execution. This allows a garbage collection process to identify live objects without exhaustively searching through the system heap. However, keeping track of such modifications incurs additional overhead which can greatly reduce system performance.

What is needed is a mechanism that keeps track modifications to pointers during program execution without a large amount of additional overhead.

SUMMARY

One embodiment of the present invention provides a system that facilitates garbage collection and supports space and time dimensional execution of a computer program. The system executes program instructions with a head thread and speculatively executes program instructions in advance of the head thread with a speculative thread. During execution of the speculative thread, the system creates space-time dimensioned versions of objects from a system heap that are modified by the speculative thread. These space-time dimensioned versions of objects are created in a speculative heap that is separate from the system heap. The system keeps a record of objects for which space-time dimensioned versions have been created during updates to value fields and during updates to pointer fields by the speculative thread. This record is subsequently used during a garbage collection operation to identify live objects so that the garbage collection operation can move the live objects from the speculative heap to the system heap.

In one embodiment of the present invention, if the speculative thread causes a hazard condition, the system performs a rollback operation. This rollback operation uses the record to identify objects in the system heap that have been modified by the speculative thread so that the modifications can be undone. Note that a hazard condition can occur if the head thread writes to a field that was read by the speculative thread, or alternatively if the head thread writes to a space-time dimensioned version of an object that was written to by the speculative thread.

In one embodiment of the present invention, the system performs a join operation between the head thread and the speculative thread when the head thread reaches a point in a program where the speculative thread began executing. This join operation causes state associated with the speculative thread to be merged with state associated with the head thread.

In one embodiment of the present invention, the head thread and the speculative thread perform the join operation and the garbage collection operation in parallel.

BRIEF DESCRIPTION OF THE FIGURES

FIG. 7 is a flow chart illustrating operations involved in performing a write to a memory element by a head thread in accordance with an embodiment of the present invention.

FIG. 8 is a flow chart illustrating operations involved in performing a read to a memory element by a speculative thread in accordance with an embodiment of the present invention.

FIG. 9 is a flow chart illustrating operations involved in performing a write to a memory element by a speculative thread in accordance with an embodiment of the present invention.

FIG. 10 is a flow chart illustrating operations involved in performing a join between a head thread and a speculative thread in accordance with an embodiment of the present invention.

FIG. 11 is a flow chart illustrating operations involved in performing a join between a head thread and a speculative thread in accordance with another embodiment of the present invention.

FIG. 13 is a flow chart illustrating the process of updating a speculative update list in accordance with an embodiment of the present invention.

FIG. 14 is a flow chart illustrating the process of resetting the speculative update list in accordance with an embodiment of the present invention.

DETAILED DESCRIPTION

The following description is presented to enable any person skilled in the art to make and use the invention, and is provided in the context of a particular application and its requirements. Various modifications to the disclosed embodiments will be readily apparent to those skilled in the art, and the general principles defined herein may be applied to other embodiments and applications without departing from the spirit and scope of the present invention. Thus, the present invention is not intended to be limited to the embodiments shown, but is to be accorded the widest scope consistent with the principles and features disclosed herein.

The data structures and code described in this detailed description are typically stored on a computer readable storage medium, which may be any device or medium that can store code and/or data for use by a computer system. This includes, but is not limited to, magnetic and optical storage devices such as disk drives, magnetic tape, CDs (compact discs) and DVDs (digital video discs), and computer instruction signals embodied in a carrier wave. For example, the carrier wave may carry information across a communications network, such as the Internet.

Computer System

Figure 1:
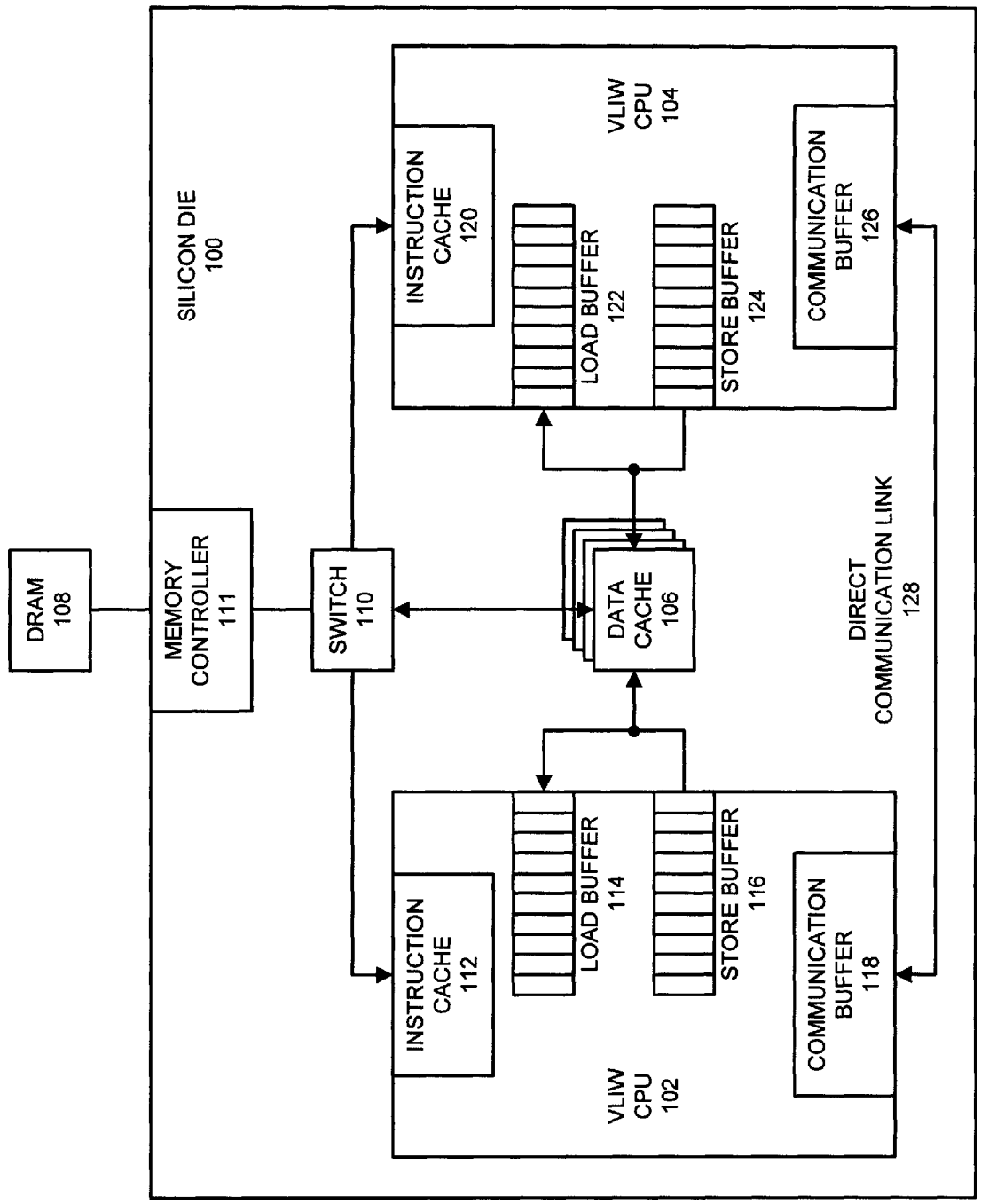
FIG. 1 illustrates a computer system including two central processing units sharing a common data cache in accordance with an embodiment of the present invention.

FIG. 1 illustrates a computer system including two central processing units (CPUs) 102 and 104 sharing a common data cache 106 in accordance with an embodiment of the present invention. In this embodiment, CPUs 102 and 104 and data cache 106 reside on silicon die 100. Note that CPUs 102 and 104 may generally be any type of computational devices that allow multiple threads to execute concurrently.

In the embodiment illustrated in FIG. 1, CPUs 102 and 104 are very long instruction word (VLIW) CPUs, which support concurrent execution of multiple instructions executing on multiple functional units. VLIW CPUs 102 and 104 include instruction caches 112 and 120, respectively, containing instructions to be executed by VLIW CPUs 102 and 104.

VLIW CPUs 102 and 104 additionally include load buffers 114 and 122 as well as store buffers 116 and 124 for buffering communications with data cache 106. More specifically, VLIW CPU 102 includes load buffer 114 for buffering loads received from data cache 106, and store buffer 116 for buffering stores to data cache 106. Similarly, VLIW CPU 104 includes load buffer 122 for buffering loads received from data cache 106, and store buffer 124 for buffering stores to data cache 106.

VLIW CPUs 102 and 104 are additionally coupled together by direct communication link 128, which facilitates rapid communication between VLIW CPUs 102 and 104. Note that direct communication link 128 allows VLIW CPU 102 to write into communication buffer 126 within VLIW CPU 104. It also allows VLIW CPU 104 to write into communication buffer 118 within VLIW CPU 102.

In the embodiment illustrated in FIG. 1, Data cache 106 is fully dual-ported allowing concurrent read and/or write accesses from VLIW CPUs 102 and 104. This dual porting eliminates cache coherence delays associated with conventional shared memory architectures that rely on coherent caches.

In one embodiment of the present invention, data cache 106 is a 16K byte 4-way set-associative data cache with 32 byte cache lines.

Data cache 106, instruction caches 112 and instruction cache 120 are coupled through switch 110 to memory controller 111. Memory controller 111 is coupled to dynamic random access memory (DRAM) 108, which is located off chip. Switch 110 may include any type of circuitry for switching signal lines. In one embodiment of the present invention, switch 110 is a cross bar switch.

The present invention generally applies to any computer system that supports concurrent execution by multiple threads and is not limited to the illustrated computing system. However, note that data cache 106 supports fast accesses to shared data items. These fast accesses facilitate efficient sharing of status information between VLIW CPUs 102 and 104 to keep track of accesses to versions of memory objects.

Space-Time Dimensional Execution of Methods

Figure 2A:
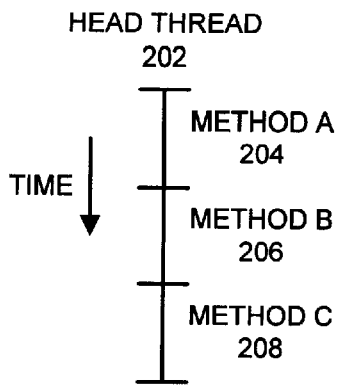
FIG. 2A illustrates sequential execution of methods by a single thread.

FIG. 2A illustrates sequential execution of methods in a conventional computer system by a single head thread 202. In executing a program, head thread 202 executes a number of methods in sequence, including method A 204, method B 206 and method C 208.

Figure 2B:
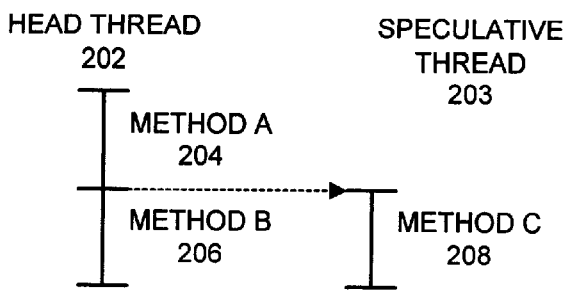
FIG. 2B illustrates space and time dimensional execution of a method in accordance with an embodiment of the present invention.

In contrast, FIG. 2B illustrates space and time dimensional execution of a method in accordance with an embodiment of the present invention. In FIG. 2B, head thread 202 first executes method A 204 and then executes method B 206. (For this example, assume that method B 206 returns a void or some other value that is not used by method C 208. Alternatively, if method C 208 uses a value returned by method B206, assume that method C 208 uses a predicted return value from method B 206.)

As head thread 202 executes method B 206, speculative thread 203 executes method C 208 in a separate space-time dimension of the heap. If head thread 202 successfully executes method B 206, speculative thread 203 is joined with head thread 202. This join operation involves causing state associated with the speculative thread 203 to be merged with state associated with the head thread 202 and the collapsing of the space-time dimensions of the heap.

If speculative thread 203 for some reason encounters problems in executing method C 208, speculative thread 203 performs a rollback operation. This rollback operation allows speculative thread 203 to reattempt to execute method C 208. Alternatively, head thread 202 can execute method C 208 non-speculatively and speculative thread 203 can execute a subsequent method.

There are a number of reasons why speculative thread 203 may encounter problems in executing method C 208. One problem occurs when head thread 202 executing method B 206 writes a value to a memory element (object) after speculative thread 203 has read the same memory element. The same memory element can be read when the two space-time dimensions of the heap are collapsed at this memory element at the time of the read by speculative thread 203. In this case, speculative thread 203 should have read the value written by head thread 202, but instead has read a previous value. In this case, the system causes speculative thread 203 to roll back so that speculative thread 203 can read the value written by head thread 202.

Note that the term "memory element" generally refers to any unit of memory that can be accessed by a computer program. For example, the term "memory element" may refer to a bit, a byte or a word memory, as well as a data structure or an object defined within an object-oriented programming system.

Figure 3:
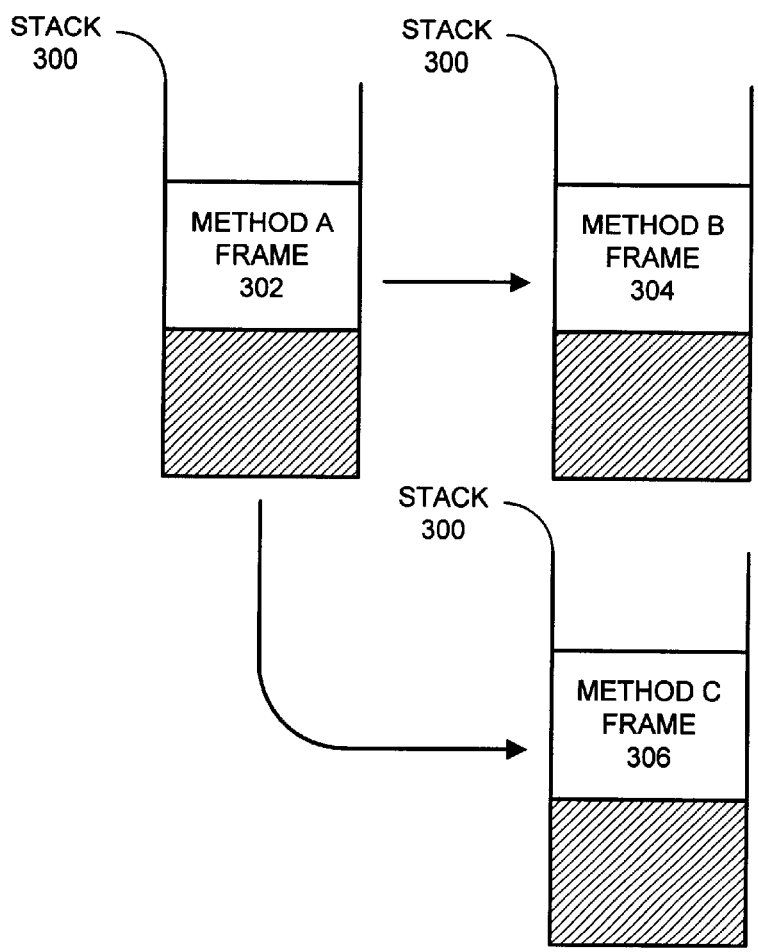
FIG. 3 illustrates the state of the system stack during space and time dimensional execution of a method in accordance with an embodiment of the present invention.

FIG. 3 illustrates the state of the system stack during space and time dimensional execution of a method in accordance with an embodiment of the present invention. Note that since programming languages such as the Java programming language do not allow a method to modify the stack frame of another method, the system stack will generally be the same before method B 206 is executed as it is before method C 208 is executed. (This is not quite true if method B 206 returns a parameter through the system stack. However, return parameters are can be explicitly dealt with as is described below.) Referring the FIG. 3, stack 300 contains method A frame 302 while method A 204 is executing. When method A 204 returns, method B 206 commences and method A frame 302 is replaced by method B frame 304. Finally, when method B 206 returns, method C 208 commences and method B frame 304 is replaced by method C frame 306. Note that since stack 300 is the same immediately before method B 206 executed as it is immediately before method C 208 is executed, it is possible to execute method C 208 using a copy of stack 300 without first executing method B 206.

In order to undo the results of speculatively executed operations, updates to memory need to be versioned. The overhead involved in versioning all updates to memory can be prohibitively expensive due to increased memory requirements, decreased cache performance and additional hardware required to perform the versioning.

Fortunately, not all updates to memory need to be versioned. For example, updates to local variables—such as a loop counter—on a system stack are typically only relevant to the thread that is updating the local variables. Hence, even for speculative threads, versioning updates to these local variables is not necessary.

When executing programs written in conventional programming languages, such as the C programming language, it is typically not possible to determine which updates are related to the heap, and which updates are related to the system stack. These programs are typically compiled from a high-level language representation into executable code for a specific machine architecture. This compilation process typically removes distinctions between updates to heap and system stack.

The same is not true for new platform-independent computer languages, such as the JAVA™ programming language distributed by SUN Microsystems, Inc. of Palo Alto, Calif. (Sun, the Sun logo, Sun Microsystems, and Java are trademarks or registered trademarks of Sun Microsystems, Inc. in the United States and other countries.) A program written in the Java programming language is typically compiled into a class file containing Java byte codes. This class file can be transmitted over a computer network to a distant computer system to be executed on the distant computer system. Java byte codes are said to be "platform-independent," because they can be executed across a wide range of computing platforms, so long as the computing platforms provide a Java virtual machine.

A Java byte code can be executed on a specific computing platform by using an interpreter or a just in time (JIT) compiler to translate the Java bytecode into machine code for the specific computing platform. Alternatively, a Java byte code can be executed directly on a Java bytecode engine running on the specific computing platform.

Fortunately, a Java bytecode contains more syntactic information than conventional machine code. In particular, the Java bytecodes differentiate between accesses to local variables in the system stack and accesses to the system heap. Furthermore, programs written in the Java programming language do not allow conversion between primitive and reference types. Such conversion can make it hard to differentiate accesses to the system stack from accesses to the system heap at compile time.

Data Structures to Support Space-time Dimensional Execution

Figure 4:
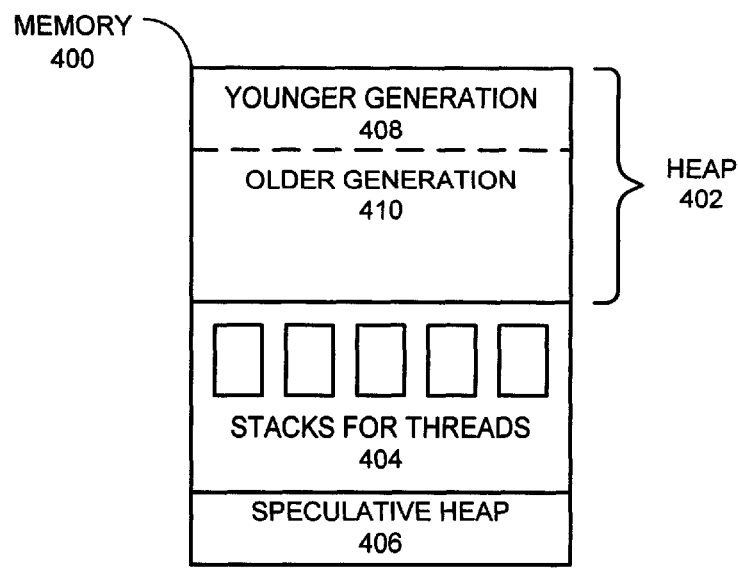
FIG. 4 illustrates how memory is partitioned between stack and heap in accordance with an embodiment of the present invention.
Figure 5:
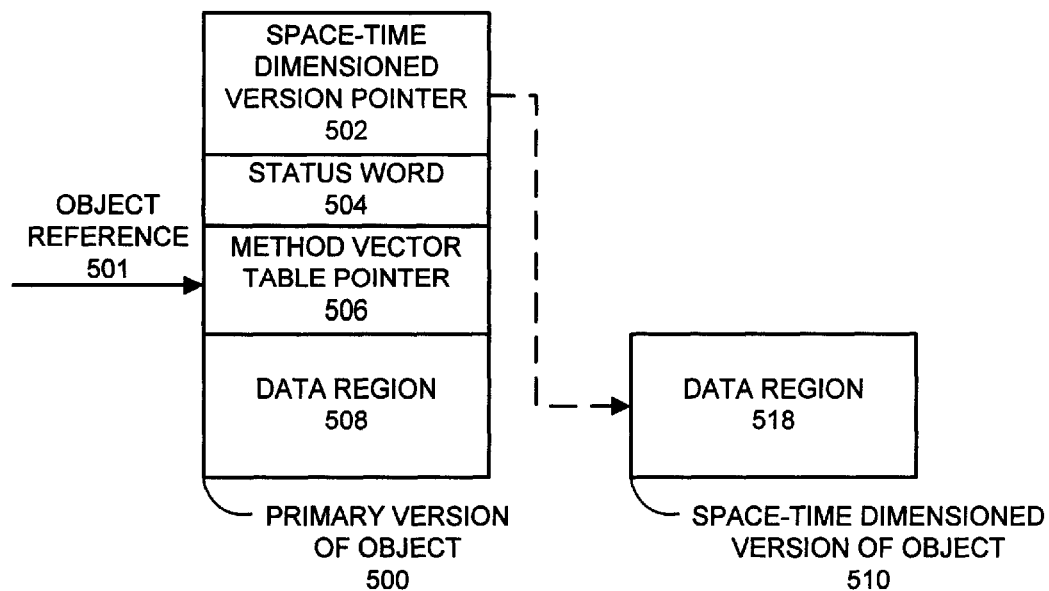
FIG. 5 illustrates the structure of a primary version and a space-time dimensioned version of an object in accordance with an embodiment of the present invention.

FIG. 4 illustrates how memory is partitioned between stack and heap in accordance with an embodiment of the present invention. In FIG. 4, memory 400 is divided into a number of regions including heap 402, stacks for threads 404 and speculative heap 406. Heap 402 comprises a region of memory from which objects are allocated. Heap 402 is further divided into younger generation region 408 and older generation region 410 for garbage collection purposes. For performance reasons, garbage collectors typically treat younger generation objects differently from older generation objects. Stack for threads 404 comprises a region of memory from which stacks for various threads are allocated. Speculative heap 406 contains the space-time dimensioned values of all memory elements where the two space-time dimensions of the heap are not collapsed. This includes space-time dimensional versions of objects, for example, version 510 of object 500 as shown in FIG. 5, and objects created by speculative thread 203. For garbage collection purposes, these objects created by speculative thread 203 can be treated as belonging to a generation that is younger than objects within younger generation region 408.

FIG. 5 illustrates the structure of a primary version of object 500 and a space-time dimensioned version of object 510 in accordance with an embodiment of the present invention.

Primary version of object 500 is referenced by object reference pointer 501. Like any object defined within an object-oriented programming system, primary version of object 500 includes data region 508, which includes one or more fields containing data associated with primary version of object 500.

Primary version of object 500 also includes method vector table pointer 506. Method vector table pointer 506 points to a table containing vectors that point to the methods that can be invoked on primary version of object 500. Primary version of object 500 also includes space-time dimensioned version pointer 502, which points to space-time dimensioned version of object 510, if the two space-time dimensions are not collapsed at this object. Note that in the illustrated embodiment of the present invention, space-time dimensioned version 510 is always referenced indirectly through space-time dimensioned version pointer 502. Primary version of object 500 additionally includes status word 504, which contains status information specifying which fields from data region 508 have been written to or read by speculative thread 203. Space-time dimensioned version of object 510 includes only data region 518.

Figure 6:
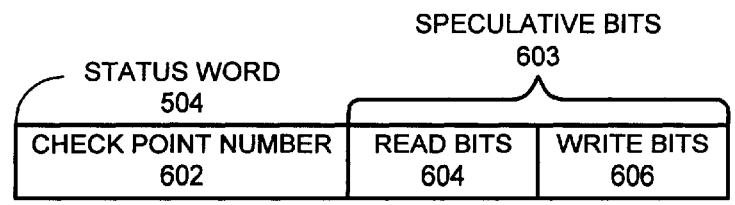
FIG. 6 illustrates the structure of a status word for an object in accordance with an embodiment of the present invention.

FIG. 6 illustrates the structure of status word 504 in accordance with an embodiment of the present invention. In this embodiment, status word 504 includes checkpoint number 602 and speculative bits 603. Speculative bits 603 includes read bits 604 and write bits 606. When status word 504 needs to be updated due to a read or a write by speculative thread 203, checkpoint number 602 is updated with the current time of the system. The current time in the time dimension of the system is advanced discretely at a join or a rollback. This allows checkpoint number 602 to be used as a qualifier for speculative bits 603. If checkpoint number 602 is less than the current time, speculative bits 603 can be interpreted as reset.

Read bits 604 keep track of which fields within data region 508 have been read since the last join or rollback. Correspondingly, write bits 606 keep track of which fields within data region 508 have been written since the last join or rollback. In one embodiment of the present invention, read bits 604 includes one bit for each field within data region 508. In another embodiment, read bits includes fewer bits than the number of fields within data region 508. In this embodiment, each bit within read bits 604 corresponds to more than one field in data region 508. For example, if there are eight read bits, each bit corresponds to every eighth field. Write bits 606 similarly can correspond to one or multiple fields within data region 508.

Space-Time Dimensional Update Process

Space-time dimensioning occurs during selected memory updates. For local variable and operand accesses to the system stack, no space-time dimensioned versions exist and nothing special happens. During read operations by head thread 202 to objects in the heap 402, again nothing special happens.

Special operations are involved in write operations by head thread 202 as well as read and write operations by speculative thread 203. These special operations are described in more detail with reference to FIGS. 7, 8 and 9 below.

FIG. 7 is a flow chart illustrating operations involved in a write operation to an object by a head thread 202 in accordance with an embodiment of the present invention. The system writes to the primary version of object 500 and the space-time dimensioned version of object 510 if the two space-time dimensions are not collapsed at this point (step 702). Next, the system checks status word 504 within primary version of object 500 to determine whether a rollback is required (step 704). A rollback is required if speculative thread 203 previously read the data element. The same memory element can be read when the two space-time dimensions of the heap are collapsed at this memory element at the time of the read by speculative thread 203. A rollback is also required if speculative thread 203 previously wrote to the object and thus ensured that the two dimensions of the object are not collapsed at this element, and if the current write operation updates both primary version of object 500 and space-time dimensioned version of object 510.

If a rollback is required, the system causes speculative thread 203 to perform a rollback operation (step 706). This rollback operation allows speculative thread 203 to read from (or write to) the object after head thread 202 writes to the object.

Note that in the embodiment of the present invention illustrated in FIG. 7 the system performs writes to both primary version 500 and space-time dimensioned version 510. In an alternative embodiment, the system first checks to determine if speculative thread 203 previously wrote to space-time dimensioned version 510. If not, the system writes to both primary version 500 and space-time dimensioned version 510. If so, the system only writes to primary version 500.

FIG. 8 is a flow chart illustrating operations involved in a read operation to an object by speculative thread 203 in accordance with an embodiment of the present invention. During this read operation, the system sets a status bit in status word 504 within primary version of object 500 to indicate that primary version 500 has been read (step 802). Speculative thread 203 then reads space-time dimensioned version 510, if it exists. Otherwise, speculative thread 203 reads primary version 500.

FIG. 9 is a flow chart illustrating operations involved in a write operation to a memory element by speculative thread 203 in accordance with an embodiment of the present invention. If a space-time dimensioned version 510 does not exist, the system creates a space-time dimensioned version 510 in speculative heap 406 (step 902). The system also updates status word 504 to indicate that speculative thread 203 has written to the object if such updating is necessary (step 903). The system next writes to space-time dimensioned version 510 (step 904). Such updating is necessary if head thread 202 must subsequently choose between writing to both primary version 500 and space-time dimensioned version 510, or writing only to primary version 500 as is described above with reference to FIG. 7.

FIG. 10 is a flow chart illustrating operations involved in a join operation between head thread 202 and a speculative thread 203 in accordance with an embodiment of the present invention. A join operation occurs for example when head thread 202 reaches a point in the program where speculative thread 203 began executing. The join operation causes state associated with the speculative thread 203 to be merged with state associated with the head thread 202. This involves copying and/or merging the stack of speculative thread 203 into the stack of head thread 202 (step 1002). It also involves merging space-time dimension and primary versions of objects (step 1004) as well as possibly garbage collecting speculative heap 406 (step 1006). In one embodiment of the present invention, one of threads 202 or 203 performs steps 1002 and 1006, while the other thread performs step 1004.

FIG. 11 is a flow chart illustrating operations involved in a join operation between head thread 202 and a speculative thread 203 in accordance with another embodiment of the present invention. In this embodiment, speculative thread 203 carries on as a pseudo-head thread. As a pseudo-head thread, speculative thread 203 uses indirection to reference space-time dimensioned versions of objects, but does not mark objects or create versions. While speculative thread 203 is acting as a pseudo-head thread, head thread 202 updates primary versions of objects.

Garbage Collection Process

Figure 12:
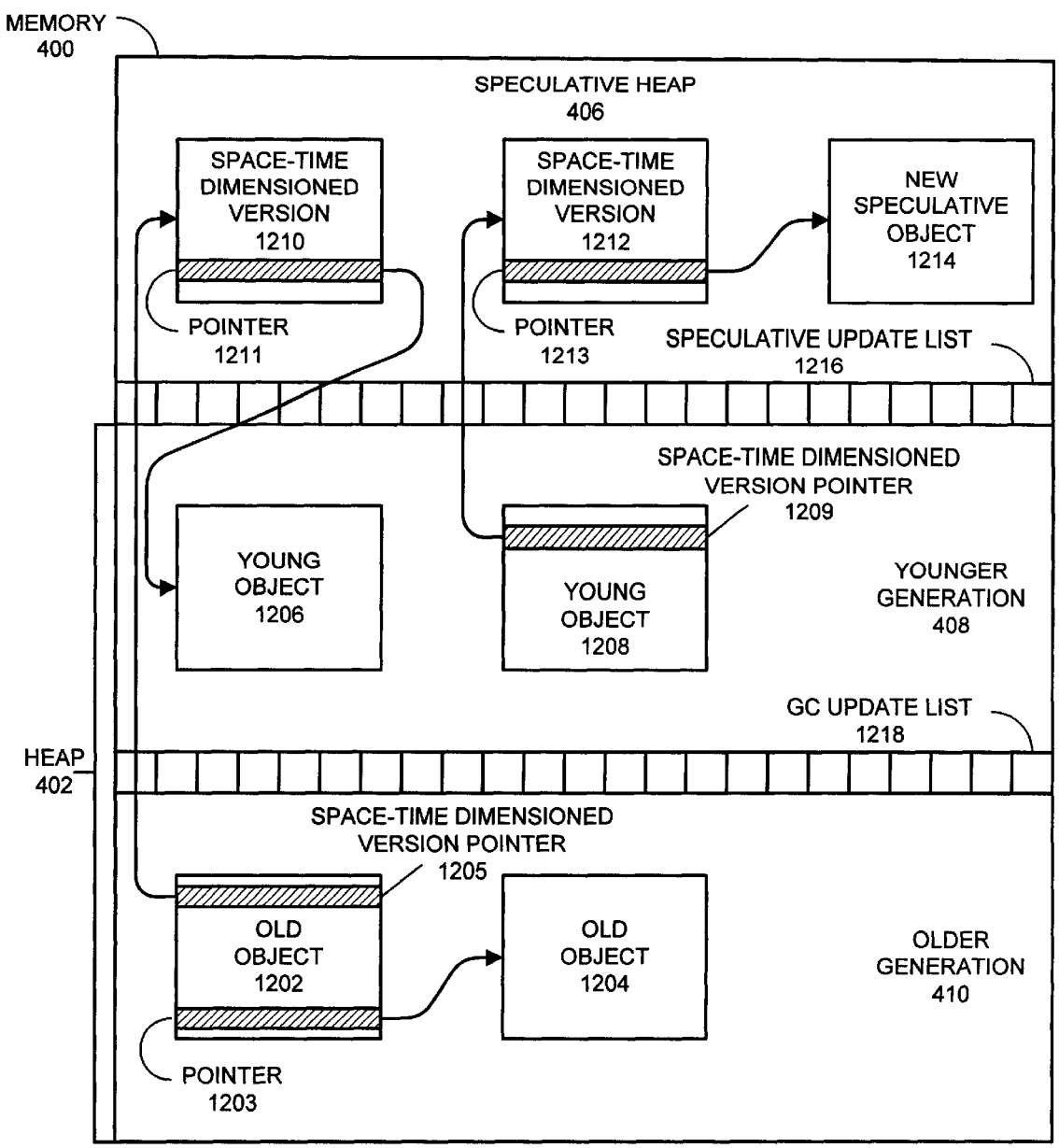
FIG. 12 illustrates objects and heaps involved in the garbage collection process in accordance with an embodiment of the present invention.

FIG. 12 illustrates data structures involved in the garbage collection process in accordance with an embodiment of the present invention. FIG. 12 presents in more detail some of the structures previously illustrated in FIG. 4. In FIG. 12, heap 402 includes GC update list 1218. GC update list 1218 is used to keep track of modifications to pointers from older generation region 410 to younger generation region 408 between garbage collections operations. This improves performance for the garbage collection process, because the root set for the garbage collection process does not have to include references to objects in older generation region 410. The garbage collection process can instead infer liveness of objects in younger generation region 408 based whether they are pointed to by objects in older generation region 410.

The system can keep track of modifications to pointer values in a number of ways. (1) Updates to pointer values can be trapped by special hardware during program execution. This allows a trap routine to add an entry to GC update list 1218. (2) Alternatively, a just-in-time compiler can add extra code to instructions that perform pointer updates so that appropriate pointer updates are recorded in GC update list 1218.

In FIG. 12, speculative heap 406 includes speculative update list 1216. Speculative update list 1216 is used to keep track of modifications to objects within heap 402 carried out by speculative thread 203 for rollback purposes. Recall that when a field of an object 500 is modified in heap 402, a space-time dimensioned version 510 of object 500 is created in speculative heap 406. Also recall that space-time dimensioned version pointer 502 is modified to point to point to space-time dimensioned version 510. During a rollback, the system uses speculative update list 1216 to identify objects within heap 402 for which space-time dimensioned versions have been created. This enables the system to undo the modifications to these objects. For example, during a rollback, space-time dimensioned version pointer 502 in object 500 in FIG. 5 can be reset to point self-referentially back to object 500 instead of pointing to space-time dimensioned version 510.

FIG. 12 also includes a number of objects. More specifically, speculative heap 406 contains space-time dimensioned versions 1210 and 1212 as well as new speculative object 1214; younger generation region 408 contains young objects 1206 and 1208; and older generation region contains old objects 1202 and 1204.

Old object 1202 has been modified by speculative thread 203 so that pointer 1203, which formerly pointed to old object 1204, points to new young object 1206. This is accomplished by creating space-time dimension version 1210, as a copy of old object 1202, and by modifying space-time dimension version pointer 1205 within old object 1202 to point to space-time dimensioned version 1210. Pointer 1211 within space-time dimensioned version 1210 (which corresponds to pointer 1203 within old object 1202) is set to point to young object 1206 instead of pointing to old object 1204.

In FIG. 12, speculative thread 203 creates new speculative object 1214 in speculative heap 406. In doing so, speculative thread 203 modifies a pointer within young object 1208 to point to new speculative object 1214. This entails creating a space-time dimensioned version 1212 containing a pointer 1213 that points to new speculative object 1214.

FIG. 13 is a flow chart illustrating the process of updating speculative update list 1216 in accordance with an embodiment of the present invention. During a store operation to a pointer field of an object, the system determines if a space-time dimensioned version of the object exists (step 1302). If so, the system updates the space-time dimensioned version of the object (step 1310).

If not, a number of actions take place. The system creates a space-time dimensioned version of the object in speculative heap 406 (step 1304). The system also adds an element to speculative update list 1216 (step 1306). This is accomplished by incrementing a pointer associated with speculative update list 1216 and by storing a pointer in speculative update list 1216 (step 1308). This pointer references an object within heap 402 for which a space-time dimensioned version has been created in speculative heap 406. (For example, in FIG. 12 when old object 1202 is modified by speculative thread 203, a pointer to old object 1202 is stored in speculative update list 1216.) Finally, the system updates the space-time dimensioned version of the object (step 1310).

FIG. 14 is a flow chart illustrating the process of resetting the speculative update list 1216 in accordance with an embodiment of the present invention. This resetting typically occurs during a rollback operation. First, for each object 500 pointed to in speculative update list 1216, the system resets space-time dimensioned version pointer 502 so that it points self-referentially back to the object 500 (step 1402). Next, speculative update list 1216 is emptied by resetting a list pointer associated with speculative update list 1216 to point to the start of speculative update list 1216 (step 1406). Next, the system advances a global time coordinate (step 1406).

Figure 15:
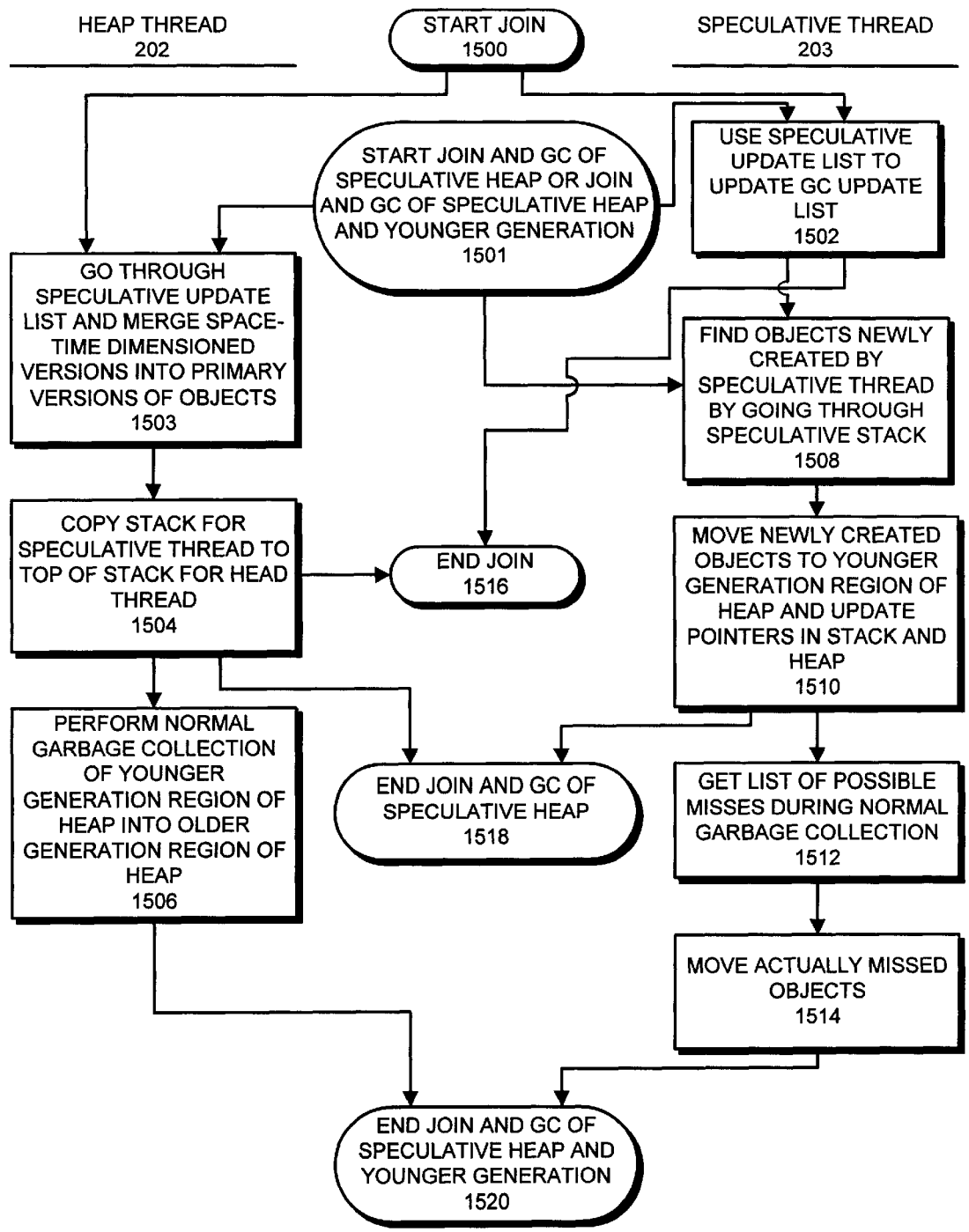
FIG. 15 is a flow chart illustrating parallel join and garbage collection operations in accordance with an embodiment of the present invention.

FIG. 15 is a flow chart illustrating parallel join and garbage collection operations in accordance with an embodiment of the present invention. The flow chart in FIG. 15 illustrates three different operations. (1) First is a parallel join operation. (2) Second is a parallel join involving a garbage collection of speculative heap 406. (3) Third is a parallel join involving a garbage collection of speculative head 406 and a garbage collection of younger generation region 408. Note that in FIG. 15 the actions of head thread 202 are illustrated in the left-hand column of FIG. 15 and the actions of speculative thread 203 are illustrated in the right-hand column of FIG. 15.

During a parallel join operation (which starts at state 1500), head thread 202 goes through speculative update list 1216. For each entry in speculative update list 1216, head thread 202 merges the space-time dimensioned versions of objects in speculative heap 406 with corresponding primary versions of objects in heap 402 (step 1503). Next, head thread 202 copies the stack for speculative thread 203 onto the top of the stack for head thread 202 (step 1504). While head thread 202 is performing these actions, speculative thread 203 uses speculative update list 1216 to update GC update list 1218 (step 1502). This involves scanning through speculative update list 1216 and copying entries corresponding the pointer updates into GC update list 1218. Note that entries corresponding to value updates are not significant for garbage collection purposes and are hence not copied into GC update list 1218. Also, only pointer updates involving objects in older generation region 410 pointing to objects in younger generation region 408 need to be recorded in GC update list 1218.

During a parallel join involving a garbage collection of speculative heap 406, head thread 202 performs the same merging and stack copying operations of the parallel join operation without garbage collection (steps 1503 and 1504). While head thread 202 is performing these actions, speculative thread 203 uses speculative update list 1216 to update GC update list 1218 (step 1502). Next, speculative thread 203 performs garbage collection operations that move live objects from speculative heap 406 into younger generation region 408 of heap 402. More specifically, speculative thread 203 finds objects that are newly created by speculative thread 203 (step 1508). This may involve scanning through a stack for speculative thread 203 to find pointers into speculative heap 406. Once these newly created objects are identified, they are moved from speculative heap 406 into the younger generation region 408 of heap 402. This moving process also involves updating stack and/or heap pointers to the newly created objects so that they point to the new locations for the newly created objects (step 1510).

During a parallel join involving a garbage collection of speculative heap 406 and a garbage collection of younger generation region 408, head thread 202 performs the same merging and stack copying operations of the parallel join operation without garbage collection (steps 1503 and 1504). Next, head thread 202 additionally performs a normal garbage collection of the younger generation region 408 of heap 402 into the older generation region 410 of heap 402 (step 1506). This involves using GC update list 1218 to identify live objects.

While head thread 202 is performing these actions, speculative thread 203 performs the same garbage collection of objects from speculative heap 406 into younger generation region 408 of heap 402 (steps 1508 and 1510). Next, speculative thread 203 gets a list of objects that are likely to have been missed during the normal garbage collection of younger generation region 408 into older generation region 410 by head thread 202 (step 1512). Speculative thread 203 examines all objects in the list and moves the ones that were actually missed by head thread 202 (step 1514).

Note that objects can be missed because of the fact that the garbage collection of speculative heap 406 into younger generation region 408 is not completed before the garbage collection of younger generation region 408 into older generation region 410 begins. For example in FIG. 12, assume that the garbage collection of younger generation region 408 into older generation region 410 completes before space-time dimensioned version 1210 is merged into old object 1202. In this case, young object 1206 will have been missed by the garbage collection from younger generation region 408 into older generation region 410.

To remedy this problem, speculative thread 203 gets a list of possible misses by examining space-time dimensioned versions of objects in speculative heap 406, and uses this list to find young object 1206 so that young object 1206 can be moved into older generation region 410.

The foregoing descriptions of embodiments of the invention have been presented for purposes of illustration and description only. They are not intended to be exhaustive or to limit the invention to the forms disclosed. Accordingly, many modifications and variations will be apparent to practitioners skilled in the art. Additionally, the above disclosure is not intended to limit the invention. The scope of the invention is defined by the appended claims.

What is claimed is:

1. A method for performing garbage collection in a system that supports space and time dimensional execution of a computer program, the system including a system heap containing objects, the method comprising:
   executing program instructions with a head thread;
   speculatively executing program instructions in advance of the head thread with a speculative thread,
   creating space-time dimensioned versions of the objects from the system heap that are modified by the speculative thread, the space-time dimensioned versions being created in a speculative heap that is separate from the system heap;
   keeping a record of objects for which space-time dimensioned versions have been created during updates to value fields and during updates to pointer fields by the speculative thread; and
   using the record during a garbage collection operation to identify live objects, the garbage collection operation moving the live objects from the speculative heap to the system heap.

2. The method of claim 1, further comprising if the speculative thread causes a hazard condition, performing a rollback, wherein the rollback uses the record to identify objects in the system heap that have been modified by the speculative thread so that the modifications can be undone.

3. The method of claim 2, wherein the hazard condition occurs if the head thread writes to a field that was read by the speculative thread, or if the head thread writes to a space-time dimensioned version of an object that was written to by the speculative thread.

4. The method of claim 1, further comprising performing a join operation between the head thread and the speculative thread when the head thread reaches a point in a program where the speculative thread began executing, the join operation causing state associated with the speculative thread to be merged with state associated with the head thread.

5. The method of claim 4, wherein the head thread and the speculative thread perform the join operation in parallel.

6. The method of claim 4, wherein the head thread and the speculative thread perform the join operation and the garbage collection operation in parallel.

7. The method of claim 1, wherein the head thread and the speculative thread perform the garbage collection operation in parallel, and wherein the garbage collection operation moves objects from the speculative heap to a younger generation area of the system heap, and from the younger generation area of the system heap to an older generation area of the system heap.

8. The method of claim 1, further comprising keeping a second record of modifications by the head thread to pointer fields of the objects for garbage collection purposes.

9. The method of claim 1, further comprising keeping a second record of modifications by the head thread to pointer fields of the objects through a trap handling routine that is triggered by modifications to the pointer fields.

10. The method of claim 1, further comprising keeping a second record of modifications by the head thread to pointer fields of the objects through instructions that are inserted during a just-in-time (JIT) compilation process.

11. A computer readable storage medium storing instructions that when executed by a computer cause the computer to perform a method for performing garbage collection in a system that supports space and time dimensional execution of a computer program, the system including a system heap containing objects, the method comprising:
   executing program instructions with a head thread;
   speculatively executing program instructions in advance of the head thread with a speculative thread;
   creating space-time dimensioned versions of the objects from the system heap that are modified by the speculative thread, the space-time dimensioned versions being created in a speculative heap that is separate from the system heap;
   keeping a record of objects for which space-time dimensioned versions have been created during updates to value fields and during updates to pointer fields by the speculative thread; and
   using the record during a garbage collection operation to identify live objects for garbage collection purposes, the garbage collection operation moving live objects from the speculative heap to the system heap.

12. A method for performing garbage collection in a system that supports space and time dimensional execution of a computer program, the system including a system heap containing objects, the method comprising:

executing program instructions with a head thread;

speculatively executing program instructions in advance of the head thread with a speculative thread;

creating space-time dimensioned versions of the objects from the system heap that are modified by the speculative thread, the space-time dimensioned versions being created in a speculative heap that is separate from the system heap;

keeping a record indicating objects for which space-time dimensioned versions have been created during updates to value fields and during updates to pointer fields by the speculative thread;

keeping a second record of modifications by the head thread to pointer fields of the objects for garbage collection purposes;

if the speculative thread causes a hazard condition, performing a rollback, wherein the rollback uses the record to identify objects in the system heap that have been modified by the speculative thread so that the modifications can be undone;

using the record during a garbage collection operation to identify live objects, the garbage collection operation moving the live objects from the speculative heap to the system heap; and performing a join operation between the head thread and the speculative thread when the head thread reaches a point in a program where the speculative thread began executing, the join operation causing state associated with the speculative thread to be merged with state associated with the head thread.

13. An apparatus that supports space and time dimensional execution of a program and garbage collection, comprising:

a head thread that executes program instructions;

a speculative thread that speculatively executes program instructions in advance of the head thread;

a system heap containing objects;

a speculative heap containing space-time dimensioned versions of objects;

a version creating mechanism that creates space-time dimensioned versions of the objects from the system heap that are modified by the speculative thread, the space-time dimensioned versions being created in the speculative heap;

a record keeping mechanism that keeps a record indicating objects for which space-time dimensioned versions have been created during updates to value fields and during updates to pointer fields by the speculative thread; and a garbage collection mechanism that uses the record to identify live objects in order to move the live objects from the speculative heap to the system heap.

14. The apparatus of claim 13, further comprising a rollback mechanism that is configured to perform a rollback if the speculative thread causes a hazard condition, wherein the rollback uses the record to identify objects in the system heap that have been modified by the speculative thread so that the modifications can be undone.

15. The apparatus of claim 14, wherein the hazard condition occurs if the head thread writes to a field that was read by the speculative thread, or if the head thread writes to a space-time dimensioned version of an object that was written to by the speculative thread.

16. The apparatus of claim 13, further comprising a join mechanism that is configured to perform a join operation between the head thread and the speculative thread when the head thread reaches a point in the program where the speculative thread began executing, the join operation causing state associated with the speculative thread to be merged with state associated with the head thread.

17. The apparatus of claim 16, wherein the join mechanism is configured to use the head thread and the speculative thread operating in parallel to perform the join operation.

18. The apparatus of claim 13, wherein the garbage collection mechanism is configured to use the head thread and the speculative thread operating in parallel to move objects from the speculative heap to a younger generation area of the system heap, and from the younger generation area of the system heap to an older generation area of the system heap.

19. The apparatus of claim 13, further comprising a second record keeping mechanism that keeps a second record of modifications by the head thread to pointer fields of the objects for garbage collection purposes.

20. The apparatus of claim 13, further comprising a second record keeping mechanism that keeps a second record of modifications by the head thread to pointer fields of the objects through a trap handling routine that is triggered by modifications to the pointer fields.

21. The apparatus of claim 13, further comprising a second record keeping mechanism that keeps a second record of modifications by the head thread to pointer fields of the objects through instructions that are inserted during a just-in-time (JIT) compilation process.

* * * * *